United States Patent [19]

Takahashi et al.

[11] 4,031,964
[45] June 28, 1977

[54] AUTOMATIC CONTROL SYSTEM CONTROLLING A RIPPER USED ON A CONSTRUCTION EQUIPMENT

[75] Inventors: Yasuyuki Takahashi; Tomoharu Sano, both of Hirakata, Japan

[73] Assignee: Kabushiki Kaisha Komatsu Seisakusho, Japan

[22] Filed: Jan. 29, 1975

[21] Appl. No.: 545,318

[30] Foreign Application Priority Data

Feb. 1, 1974 Japan .................. 49-12725

[52] U.S. Cl. .................. 172/9; 172/12; 172/430; 172/484; 172/699
[51] Int. Cl.[2] .................. A01B 63/112
[58] Field of Search .................. 172/2, 4, 5, 6, 7, 9, 172/11, 12, 38, 233, 239, 261, 430, 484, 699; 91/459, 461; 37/DIG. 1, DIG. 6; 180/14.5; 280/448, 449; 200/81.9 R, 82 C, 82 W

[56] References Cited

UNITED STATES PATENTS

| | | | |
|---|---|---|---|
| 2,745,328 | 5/1956 | Brimhall | 172/7 |
| 3,503,456 | 3/1970 | Larson | 172/484 |
| 3,658,133 | 4/1972 | Sweet et al. | 172/4 |
| 3,674,095 | 7/1972 | Roger | 172/7 |
| 3,825,072 | 7/1974 | Collins | 172/7 |
| 3,939,758 | 2/1976 | Faisandier | 200/83 W X |

*Primary Examiner*—Richard T. Stouffer

[57] ABSTRACT

An automatic control system for a ripper used on a construction equipment in which a load detector is provided on the ripper for detecting load acting on the ripper shank and lift cylinders are actuated to automatically raise the shank when overload is applied to the shank during ripping operation. The ripper is also provided with a depth detector for detecting upper and lower limit positions of the shank and the vertical movement of the shank can be limited between the upper and lower limits. When no overload is applied, the shank is maintained at the lower limit position to rip the ground at a predetermined penetration depth.

6 Claims, 5 Drawing Figures

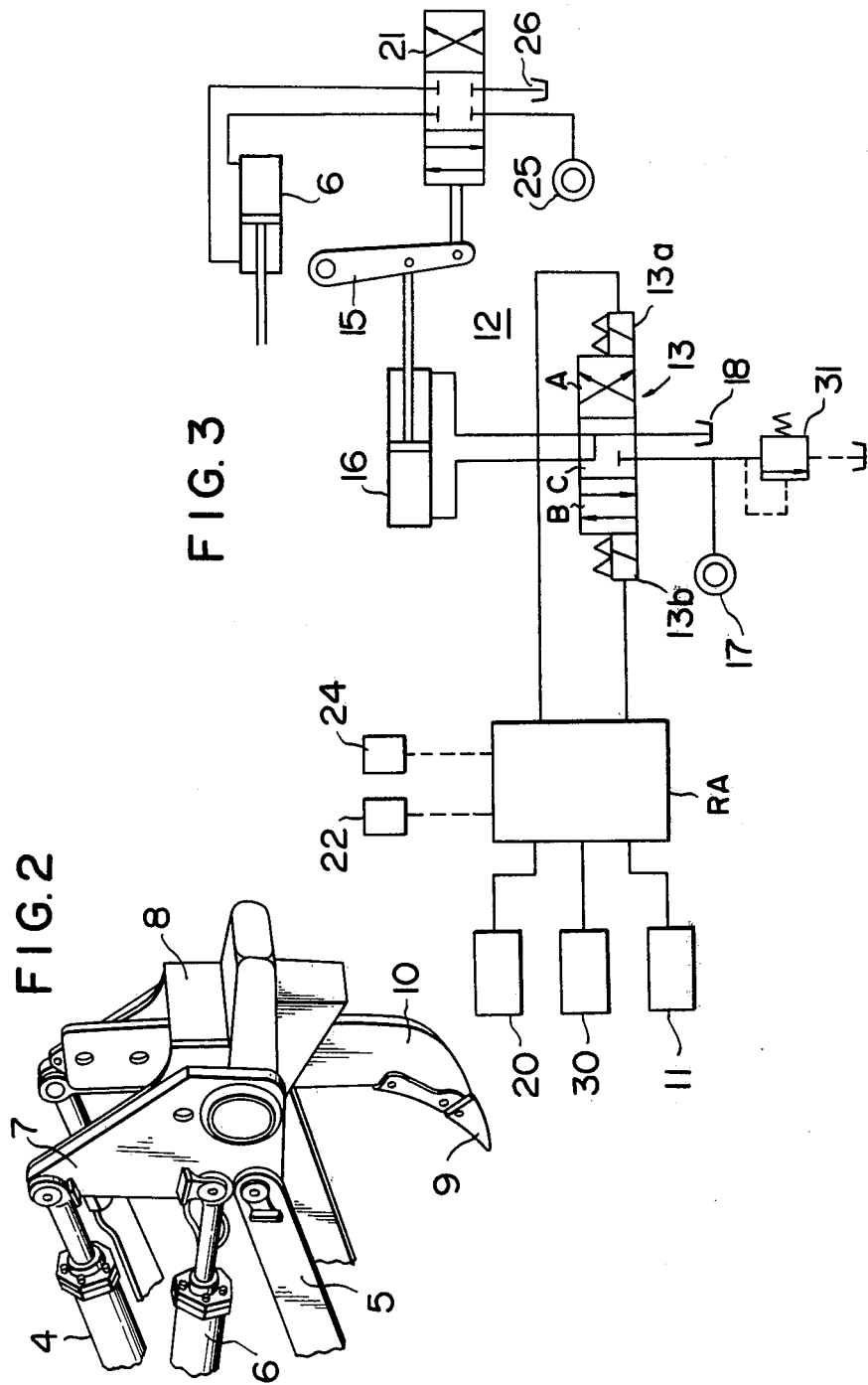

AUTOMATIC CONTROL SYSTEM CONTROLLING A RIPPER USED ON A CONSTRUCTION EQUIPMENT

BACKGROUND OF THE INVENTION

This invention relates to an automatic control system for a ripper used on a construction equipment capable of detecting load applied to the ripper and automatically selecting an optimum depth of penetration of the ripper in response to the detected load.

In the past, ripping operation by a ripper mounted on the rear portion of a construction equipment such as a tractor has been manually controlled by the operator who raises or lowers the ripper shank dependent upon his experience based on the ground condition, vehicle speed and other working conditions. This naturally requires considerable skill and experience on the part of the operator. Besides, the operator must constantly keep watching on the progress of the ripping operation so that he can manually control raising and lowering of the ripper shank. This increases fatigue of the operator and adversely affects work efficiency.

It is therefore an object of this invention to eliminate the above described disadvantages of the prior art ripper and provides a novel control system capable of automatically raising and lowering the ripper shank.

According to the invention, an automatic control system is provided wherein penetration depth of the ripper shank is maintained at a predetermined value when load which does not exceed a predetermined value (hereinafter referred to as a normal load) is applied to the shank whereas the shank is raised to reduce load when load exceeding the predetermined value (hereinafter referred to as overload) is applied thereto.

It is another object of the invention to provide a system capable of controlling raising and lowering of the shank both manually and automatically as well as capable of manually controlling tilting or inclination angle of the shank if necessary.

According to the invention, ripping operation can be performed without any special experience or skill and no particular manipulation is required during the ripping operation. As a result, efficiency in the ripping operation is greatly improved.

These and other features and objects of the invention will become apparent from the description made hereinbelow with reference to the accompanying drawings in which:

FIG. 2 is a perspective view showing construction of the ripper;

FIG. 3 is a schematic diagram showing the outline of the electrical circuit and the hydraulic system employed in the control system according to the invention;

Figure 1:
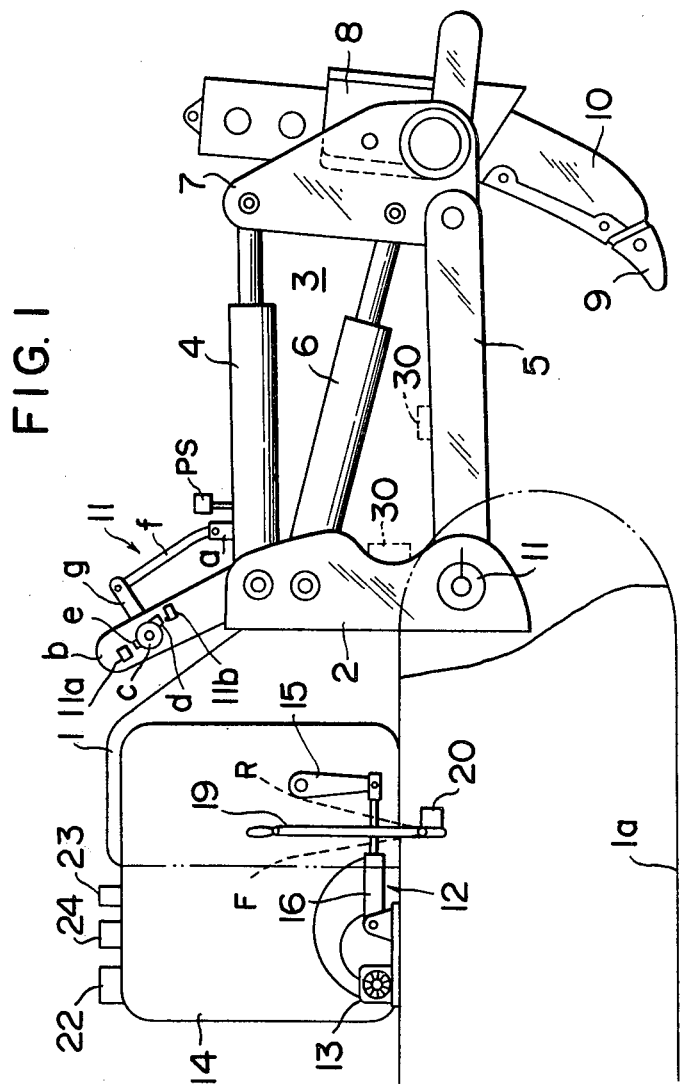
FIG. 1 is a side elevational view showing the ripper mounted on a tractor and an operation unit therefor.

Referring first to FIGS. 1 and 2, a tractor which is taken by way of example has a body 1 and runs by means of a caterpillar 1a. A pair of mounting brackets 2 are fixedly secured to the rear portion of the body 1. A ripper which is generally designated by reference numeral 3 is detachably mounted on the mounting brackets 2.

The ripper 3 comprises a pair of tilt cylinders 4, a pair of links 5 which extend parallel to the tilt cylinders, a pair of lift cylinders 6 provided diagonally between the tilt cylinders 4 and the links 5, a pair of beam brackets 7 which are pivotally mounted at the upper portion thereof to the ends of the tilt cylinders 4 remote from the mounting brackets 2 and, at the lower portion thereof, to the end portion of the links 5 and lift cylinders 6 remote from the mounting brackets, a shank holder 8 provided between and secured to the pair of beam brackets 7 and a shank 10 detachably inserted in the slot formed in the shank holder 8 and having a point or tip 9 at the lowermost end portion thereof.

An operation unit 12 comprises an electromagnetic valve 13 controlled by an electrical signal to be described later, a hydraulic actuator 16 operated by fluid under pressure supplied from the electromagnetic valve 13, an operation lever 15 actuated by the rod of the hydraulic actuator 16 and a ripper actuation valve (designated by a reference numeral 21 in FIG. 3) controlled by the operation lever 15. At the lower portion of a speed change lever 19 is provided a forward and reverse position detector 20 which closes and opens in accordance with the forward position F and reverse position R of the speed change lever 19. A depth detector 11 is provided for detecting the penetration depth of the ripper shank 10 by the rotation angle of the tilt cylinder. The depth detector 11 comprises a bracket $a$ mounted at the end portion nearer to the mounting bracket 2 of one of the tilt cylinders 4, a disc $c$ rotatably mounted on a bracket $b$ which is fixedly secured to the mounting bracket 2, an upper limit cam $d$ and a lower limit cam $e$ fixed to the disc $c$, limit switches $11b$ and $11a$ fixed to the bracket $b$ and engageable with the cams $d$ and $e$ respectively and rods $f$ and $g$ provided between the bracket $a$ and the disc $c$ for mechanically transmitting the pivotal motion of the tilt cylinder 4 to the disc $c$ to rotate the disc $c$. The depth detector 11 is adapted to detect mechanically and electrically a predetermined upper limit and a predetermined penetration depth of the shank 10. The mounting positions of the cams $d$ and $e$ are adjustable. Alternatively, the depth detector 11 may be so constructed that rotation of the pivot pin of the links 5 may be detected by a limit switch.

A load detector 30 is provided for detecting load exceeding a predetermined value, i.e., overload applied to the shank 10. As the load detector 30, a strain gauge or meter which electrically detects strain produced by the overload or a pressure switch which switches from one position to another when pressure in the tilt cylinders 4 has exceeded a predetermined value can advantageously be used. In case the strain gauge is used, it can be mounted on a place which is convenient for detecting the strain, for example the curved portion of the mounting bracket 2 or the end portion of the tilt cylinder 4 or the link 5 nearer to the mounting bracket 2. In case of the pressure switch, it may preferably be mounted on the end portion of one of the tilt cylinders 4 nearer to the mounting bracket 2 so that fluid under pressure may be introduced into the pressure switch 4 through a hole formed in the end portion of the tilt cylinder 4. On the top of an oil reservoir 14 there are provided an automatic-manual selection switch 22 for selecting an automatic or manual operation of the ripper 3, a switch 24 for raising or lowering the shank 10 by manual manipulation and a switch 23 for manually controlling tilting of the shank 10.

FIG. 3 schematically shows the electrical system employed in the control system according to the invention. The output signal from the forward and reverse position detector 20 is applied to a relay circuit RA. A forward movement signal from the detector 20 enables the relay circuit RA to perform the automatic control of the ripper only during the forward movement of the tractor. The output signal of the load detector 30 which represents overload acting on the ripper shank 10 is applied to the relay circuit RA thereby causing the relay circuit RA to raise the shank 10 only if overload is applied when the tractor is moving forwardly. The depth detector 11 provides the relay circuit RA with a signal representing the upper limit position of the shank 10 and a signal representing the optimum depth of the shank 10. If the former signal is applied during the automatic forward movement, the relay circuit RA stops lifting of the shank 10. If the latter signal is applied, the relay circuit RA stops lowering of the shank 10 and maintains it at the optimum penetration depth so long as no excessive load is being applied to the shank and the tractor is moving forwardly. As to the relay circuit RA, a more detailed description will be made later with reference to one preferred example shown in FIG. 4.

The electromagnetic valve 13 is actuated by the control signal supplied from the relay circuit RA. The valve is shifted to a shank raising position A when its exciting coil 13a is energized, to a shank lowering position B when its exciting coil 13b is energized and returns to a neutral position C when both coils are deenergized. The direction of fluid under pressure from a fluid source 17 changes as the valve is shifted from one position to another thereby causing stretching and retraction of the hydraulic actuator 16. In the neutral position C, supply of fluid from the fluid source 17 to the actuator 16 is interrupted and either port of the actuator 16 is communicated to a drain 18. The foremost end portion of the rod of the actuator 16 is pivotally connected to the middle portion of the operation lever 15 and the operation lever 15 moves in a pivotal motion as the rod of the actuator 16 stretches and retracts. The pivotal movement of the operation lever 15 actuates the ripper actuation valve 21 thereby causing fluid under pressure from fluid source 25 to be introduced into the lift cylinders 6 through the ripper actuation valve 21 for operating the lift cylinders 6. A relief valve 31 is provided for reducing fluid pressure by releasing fluid when the pressure exceeds a predetermined value.

Figure 4:
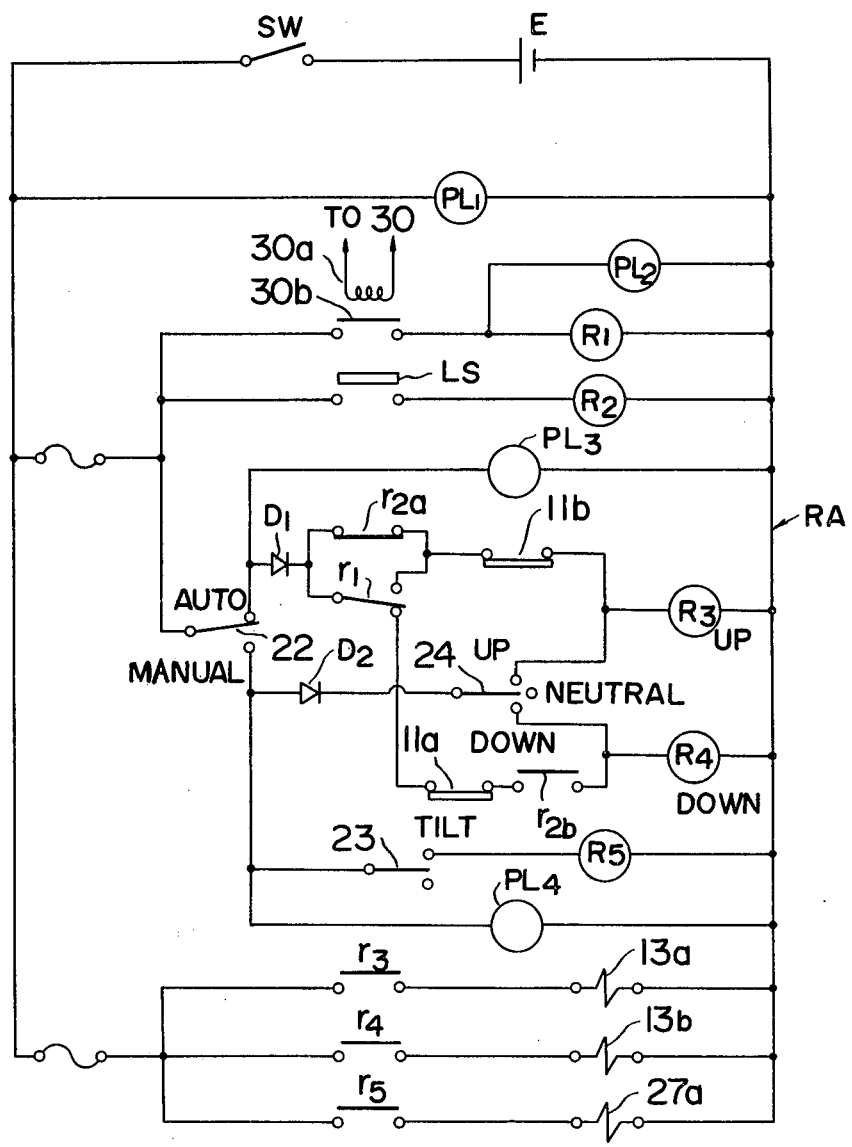
FIG. 4 is a circuit diagram showing one example of the electrical circuit of the control system according to the invention.

FIG. 4 shows one example of actual construction of the relay circuit RA. In the example shown in FIG. 4, let us assume that a load detector of a strain gauge type is used. FIG. 4 shows a relay coil 30a of the load detector which is energized when the strain gauge has detected overload and a relay contact 30b corresponding to this relay coil 30a. In FIG. 4, the forward reverse position detector 20 is shown as a limit switch LS which closes when the speed change lever 19 is shifted to the forward position and opens when the lever 19 is shifted to the reverse position. There are also shown a limit switch 11b of the depth detector 11 which opens when the shank 10 is in the upper limit position and a limit switch 11a of the depth detector 11 which opens when the shank 10 is in the optimum depth position.

Assume that the shank 10 is now in the upper limit position and the limit switch 11b is open. When a power source switch SW is closed, a power source indication lamp $PL_1$ is lighted, current being supplied from power source E. If an automatic ripping operation is desired, the automatic-manual control selection switch 22 is changed over to the automatic control position and the speed change lever 19 is shifted to the forward position. This actuates the limit switch LS and a relay coil $R_2$ connected in series to the limit switch LS to close a normally open contact $r_{2b}$. As the contact $r_{2b}$ is closed, a positive voltage is applied to the relay coil $R_4$ via the switch 22, diode $D_1$, contact $r_1$, limit switch 11a and contact $r_{2b}$ to energize the relay coil $R_4$. This closes a normally open contact $r_4$ to energize the coil 13b of the electromagnetic valve 13. Thus, the electromagnetic valve 13 is changed over to the shank lowering position B and the lift cylinders 6 are actuated to lower the shank 10.

When the shank 10 has reached the predetermined depth, the depth detector 11 detects this depth and causes the limit switch 11a to open. This causes the relay coil $R_4$ to be deenergized and its contact $r_4$ to be opened. The coil 13b of the electromagnetic valve 13 is deenergized and the electromagnetic valve 13 returns to the neutral position C. Simultaneously the ripper actuation valve is switched to the shank holding position to hold the shank 10 in that position. Accordingly, the ripper can perform the ripping operation at the predetermined optimum depth.

If load of a value which is greater than a predetermined value is applied to the shank 10, the coil 30a of the load detector 30 is energized and its contact 30b is closed. This causes the relay coil $R_1$ to be energized and a pilot lamp $PL_2$ to be lighted for giving an alarm. As the relay coil $R_1$ is energized and its contact $r_1$ is switched to a reverse position with respect to the position shown in the figure, the relay coil $R_3$ is energized and the normally open contact $r_3$ is closed. Thus, the coil 13a of the electromagnetic valve 13 is energized and the electromagnetic valve 13 is switched to the shank raising position A. Thus, fluid under pressure is supplied to the rod side of the hydraulic actuator 16 and the ripper control valve 21 is switched to the shank raising position. The shank 10 is raised by the lift cylinder 6. As the shank 10 is raised, load acting on the shank 10 decreases. When the load has decreased below the predetermined value, the coil 30a of the load detector 30 is deenergized and the contact 30b is opened. The relay coil $R_1$ is deenergized and its contact $r_1$ is switched to a position shown in the figure. Thus, supply of electrical current to the coil 13a of the electromagnetic valve 13 is interrupted and the lifting of the shank 10 is stopped. It will be understood that penetration depth of the shank 10 at this time is the optimum depth corresponding to the magnitude of load.

Then the contact $r_1$ is changed over to the lowering position so that the shank 10 continues to be lowered to the predetermined depth unless overload is applied to the shank 10.

The above operation is continuously performed and the shank 10 automatically continues to rip the ground at the predetermined depth when a normal load is applied. When overload is applied to the shank 10, the shank 10 can be lifted to a depth at which the load is reduced to a value below the overload.

When the tractor is to be moved in reverse after completion of ripping operation, the speed change lever 19 is shifted to the reverse position. The limit switch LS is opened and the relay coil $R_2$ is deenergized. The normally closed contact $r_{2a}$ is closed to excite the relay coil $R_3$. This causes the coil 13a of the electromagnetic valve 13 to be energized resulting in lifting of the shank 10. When the depth detector 11 has detected the upper limit position of the shank 10, the limit switch 11b is opened and, accordingly, the shank 10 is held in the lifted position and the tractor is driven in reverse.

The above description has been made about the automatic control of the ripper. According to the invention, however, switching between automatic control and manual control can be effected by operation of the switch 22. If the switch 22 is switched to the manual position, a positive voltage is applied to a common contact of the switch 24. Accordingly, the shank can be moved as desired by switching the switch 24 between the shank raising position, shank lowering position and the neutral position. Diodes $D_1$ and $D_2$ are provided for ensuring lighting of a lamp $PL_3$ or $PL_4$ at the time of switching from the manual control to the automatic control or vice versa. If the tilt switch 23 is switched to the tilt position, the relay coil $R_5$ is energized and its contact $r_5$ is closed. This energizes the exciting coil 27a of a tilt electromagnetic valve 27 to be described later to switch the electromagnetic valve 27 to the tilt position. Thus, the tilt cylinders 4 are actuated and the shank 10 can be tilted by a desired angle by operation of the switch 24. It is to be noted that when either one of the manual control of raising and lowering of the shank 10 and the manual control of tilting thereof is made, the other is not performed.

Figure 5:
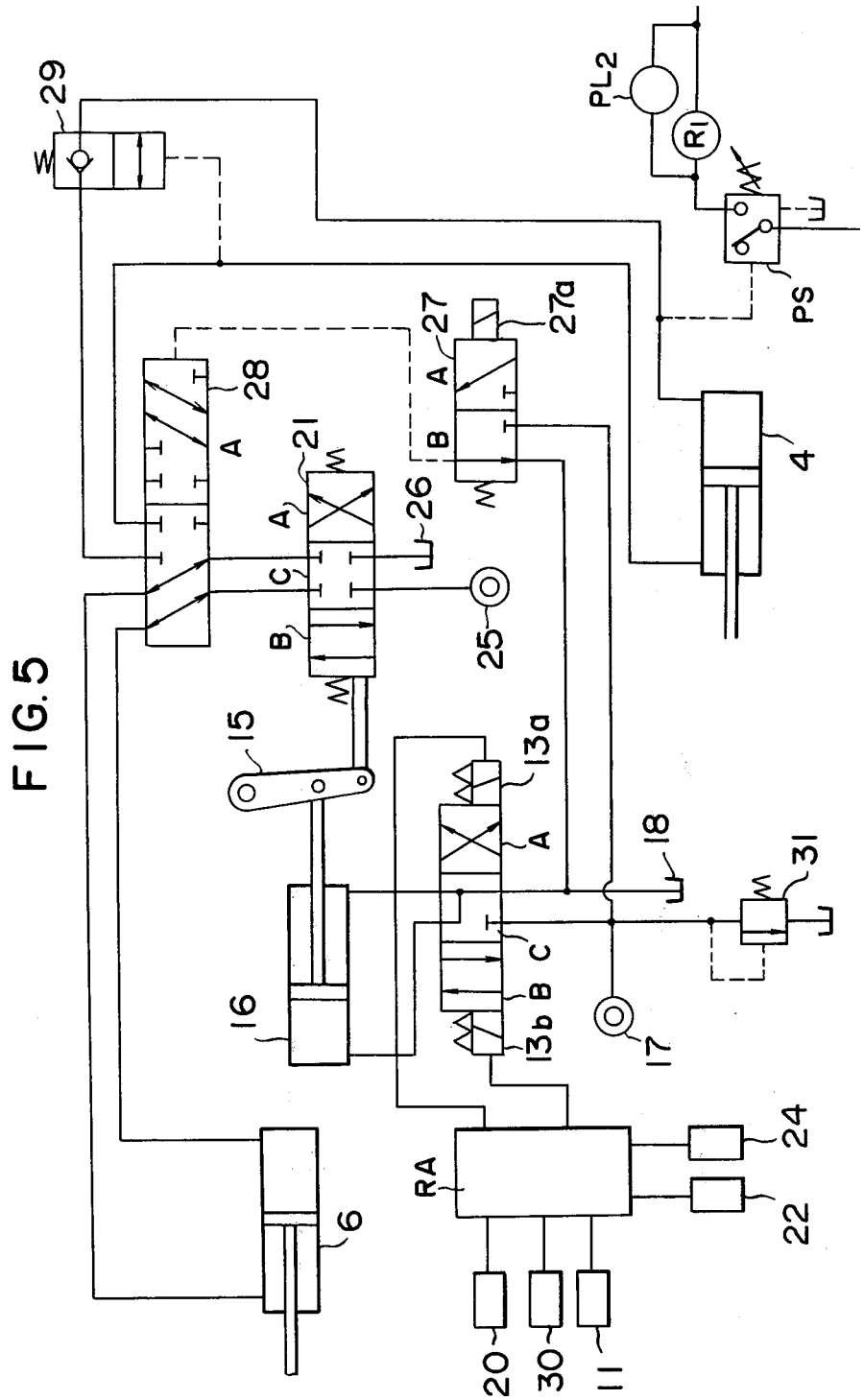
FIG. 5 is a circuit diagram showing an example of a hydraulic control system corresponding to the circuit shown in FIG. 4.

FIG. 5 is a circuit diagram of one example of the hydraulic control system in which a pressure switch PS is used as the load detector and the tilt control system is shown in detail.

In the condition shown in the figure the exciting coil 27a of the tilt electromagnetic valve 27 is not energized. In this condition, the automatic or manual control of the shank 10 as has been described in detail above can be performed. Since the pressure switch PS is used as the load detector in this example, the circuit of the relay coil $R_1$ in FIG. 4 is of a very simple construction as shown in the right bottom of FIG. 5.

During the tilt control, the exciting coil 27a of the electromagnetic valve 27 is energized and the electromagnetic valve 27 is switched to the position A. This enables fluid under low pressure from the fluid source 17 to be introduced to a changeover valve 28 through the electromagnetic valve 27. The changeover valve 28 is switched to position A in which the tilt cylinder 4 only can be actuated. If the manual switch 24 (FIG. 4) is switched to a shank raising or shank lowering position, the control valve 21 is switched to a corresponding position to actuate the tilt cylinders 4 and thereby tilt the shank 10 as has previously been described. More specifically, if the switch 23 is closed during tilting operation, the switch 24 for raising and lowering the shank is utilized for controlling tilting direction and amount. Reference numeral 29 designates a pilot check valve.

The foregoing description has been made with reference to the specific embodiments of the invention taken by way of example. It will be appreciated, however, that the invention is not limited to these embodiments and various modifications can be made without departing from the spirit and scope of the invention. For example, it is possible to control raising and lowering of the shank 10 simply by detecting overload and normal load without provision of the depth detector.

What is claimed is:

1. Automatic control system for a ripper used on a construction equipment comprising:
    a ripper mounted on the rear portion of the body of the construction equipment and including a shank, tilt cylinders for tilting the shank, lift cylinders for raising or lowering the shank, links disposed in parallel to the tilt cylinders and a shank holding structure for securely holding the shank;
    a load detector mounted on the ripper and capable of detecting overload applied to the shank;
    a depth detector for detecting predetermined upper and lower limit positions of the shank; and
    a control device actuated by the outputs of the load detector and the depth detector for maintaining penetration depth of the shank at the predetermined lower limit when normal load is applied to the shank and raising the shank when a predetermined overload is applied thereto to reduce the load to a value less than the overload;
    whereby penetration depth of the shank is automatically controlled to a value at which no overload is applied to the shank; said control device comprising:
    a first relay circuit producing a first control signal when overload is applied to the shank at a shank position which is lower than the upper limit position;
    a second relay circuit producing a second control signal when load less than overload is applied to the shank at a shank position which is not the predetermined shank position;
    an electromagnetic valve switched to a shank raising position upon receipt of the first control signal, to a shank lowering position upon receipt of the second control signal and to a neutral position when the valve receives neither signal; and
    a hydraulic actuation means for actuating the lift cylinders responsive to switching of the electromagnetic valve;
    said hydraulic actuation means comprising:
    an actuator actuated by the electromagnetic valve;
    an operation lever actuated by the rod of the actuator; and
    ripper actuation valve interlocked with the operation lever for switching operation and changing direction of fluid from a fluid source to the lift cylinder.

2. Automatic control system as defined in claim 1 including:
    a detector for detecting forward and reverse movements of the construction equipment; and
    means cooperating with said detector for actuating said relay circuits only during the forward movement of the construction equipment.

3. Automatic control system as defined in claim 1 which further comprises:
    an automatic-manual control selection switch;
    a raising and lowering selection switch for selecting shank raising, shank lowering and neutral positions; and
    means for producing shank raising and shank lowering control signals in accordance with selection of the raising and lowering selection switch.

4. Automatic control system as defined in claim 3 which further comprises:

a tilt instruction switch;

means for producing a tilt instruction signal only during the manual operation when the tilt instruction switch is switched on;

a changeover valve for selectively changing direction of a first fluid under high pressure from the ripper actuation valve between the lift cylinder and the tilt cylinder;

an electromagnetic valve which is switched upon receipt of the tilt instruction signal to supply a second fluid under low pressure to the changeover valve for actuating it; and means for actuating the tilt cylinders by operation of the raising and lowering selection switch;

whereby tilting of the shank is controlled by operation of the switches.

5. Automatic control system as defined in claim 1 wherein the load detector is a pressure switch capable of detecting internal pressure of the tilt cylinder.

6. Automatic control system for a ripper used on a construction equipment comprising:

a ripper mounted on the rear portion of the body of the construction equipment and including a shank, tilt cylinders for tilting the shank, lift cylinders for raising or lowering the shank, links disposed in parallel to the tilt cylinders and a shank holding structure for securely holding the shank;

a load detector mounted on the ripper and capable of detecting overload applied to the shank;

a depth detector for detecting predetermined upper and lower limit positions of the shank; and a control device actuated by the outputs of the load detector and the depth detector for maintaining penetration depth of the shank at the predetermined lower limit when normal load is applied to the shank and raising the shank when a predetermined overload is applied thereto to reduce the load to a value less than the overload;

whereby penetration depth of the shank is automatically controlled to a value at which no overload is applied to the shank; said depth detector comprising:

a rotatable disc with a pin;

means for rotating said disc;

a rod means connected at one end thereof to the root end portion of the tilt cylinder and at the other end to said pin of the rotatable disc;

a lower limit cam attached to the rotatable disc;

an upper limit cam attached to the rotatable disc; and limit switches actuated by the corresponding cams for detecting the lower and upper limit positions.

* * * * *